(12) United States Patent
Kinkade et al.

(10) Patent No.: US 8,776,097 B2
(45) Date of Patent: Jul. 8, 2014

(54) DYNAMIC NATIVE BINDING FOR MANAGED ASSEMBLIES

(75) Inventors: Phillip Kinkade, Los Angeles, CA (US); Brandon Cuff, Claremont, CA (US); Franklin Wise, Beverly Hills, CA (US)

(73) Assignee: Myspace, LLC, Beverly Hills, CA (US)

( * ) Notice: Subject to any disclaimer, the term of this patent is extended or adjusted under 35 U.S.C. 154(b) by 470 days.

(21) Appl. No.: 13/232,840

(22) Filed: Sep. 14, 2011

(65) Prior Publication Data
US 2012/0066699 A1   Mar. 15, 2012

Related U.S. Application Data

(60) Provisional application No. 61/383,145, filed on Sep. 15, 2010.

(51) Int. Cl.
| | |
|---|---|
| *G06F 3/00* | (2006.01) |
| *G06F 9/44* | (2006.01) |
| *G06F 9/46* | (2006.01) |
| *G06F 13/00* | (2006.01) |

(52) U.S. Cl.
USPC ............................................. 719/331

(58) Field of Classification Search
None
See application file for complete search history.

(56) References Cited

U.S. PATENT DOCUMENTS

| | | | |
|---|---|---|---|
| 6,981,268 B2 | 12/2005 | Shi et al. | |
| 7,073,170 B2 | 7/2006 | Grier et al. | |
| 7,124,408 B1 * | 10/2006 | Parthasarathy et al. | 717/170 |
| 7,472,375 B2 * | 12/2008 | Ye et al. | 717/106 |
| 7,543,309 B2 | 6/2009 | Forin et al. | |
| 8,601,452 B2 * | 12/2013 | Krasnoiarov | 717/146 |
| 2003/0182460 A1 * | 9/2003 | Khare | 719/310 |
| 2005/0246677 A1 * | 11/2005 | Mountain et al. | 717/100 |
| 2006/0080680 A1 | 4/2006 | Anwar et al. | |
| 2008/0148277 A1 * | 6/2008 | di Flora | 719/313 |
| 2008/0271007 A1 * | 10/2008 | Gou | 717/163 |
| 2009/0217200 A1 | 8/2009 | Hammack et al. | |

OTHER PUBLICATIONS

International Search Report mailed Jan. 6, 2012, International application No. PCT/US2011/051619.
Pregemik, Fran, "DLLImport with dynamically bound native DLLs using Reflection", Aug. 13, 2005, http://www.codeproject.com/KB/dotnet/DynamicDllImport.aspx.
Namdn, "Dynamic Invoke C++ DLL function in C#", Jun. 26, 2008, http://www.codeproject.com/KB/cs/DynamicInvokeCSharp.aspx.
"Setting dllimport programatically in c#", Nov. 17, 2009, http://stackoverflow.com/questions/1319849/setting-dllimport-programatically-in-c.
"DllImportAttribute Class", .NET Framework Class Library, 2010, http://msdn.microsoft.com/en-us/library/system.runtime.interoservices.dllimportattribute.

* cited by examiner

*Primary Examiner* — Emerson Puente
*Assistant Examiner* — Kimbleann Verdi
(74) *Attorney, Agent, or Firm* — Gates & Cooper LLP

(57) ABSTRACT

A method, apparatus, system, article of manufacture, and computer readable storage medium provides the ability to dynamically bind a native assembly from a managed assembly. A managed assembly (e.g., a dynamically linked library (DLL)) is obtained. In the managed assembly, native application program interface entry points are identified. For each of the entry points, intended platform(s) and associated correct native assembly(ies) are specified in the managed assembly. The managed assembly is deployed onto a computer. For example, the single collection of managed and native assemblies can be deployed to all targeted computers, which consist of varying platform environments. During runtime execution, the executing platform of the application is determined. Based on the executing platform, an intended platform is selected and the entry points are bound to the correct native assembly.

15 Claims, 5 Drawing Sheets

DYNAMIC NATIVE BINDING FOR MANAGED ASSEMBLIES

CROSS-REFERENCE TO RELATED APPLICATIONS

This application claims the benefit under 35 U.S.C. Section 119(e) of the following co-pending and commonly-assigned U.S. provisional patent application(s), which is/are incorporated by reference herein:

U.S. Provisional Patent Application Ser. No. 61/383,145, filed on Sep. 15, 2010, entitled "DYNAMIC NATIVE BINDING FOR MANAGED ASSEMBLIES" by PHILLIP KINKADE, BRANDON CUFF, and FRANKLIN WISE.

BACKGROUND OF THE INVENTION

1. Field of the Invention

The present invention relates generally to computer programming, and in particular, to a method, apparatus, and article of manufacture for dynamically binding native assemblies from platform agnostic managed assemblies.

2. Description of the Related Art

Using Microsoft's .NET Framework™, developers create managed assemblies, which are dynamic linked libraries (DLLs) that are executed by the .NET Framework. Managed assemblies can be compiled to be platform agnostic. This is known as an assembly that targets "Any CPU". This is desirable because the same binary assembly can be deployed to any platform, such as Win32™, x64™, and IA64™. Deployment means copying files to a target computer and installing the developer's work onto that computer. Typically, because of reflection, a managed assembly can only directly access other managed assemblies. In this regard, one managed assembly can inspect, find interface points, parameters, and other data about a single other managed assembly.

There are times when the developer needs to use code that is better suited, for whatever reason, in native assemblies. Native assemblies are traditional DLL's that are loaded and executed by the Windows™ operating system. Native assemblies are practically always platform-specific.

The fact that native assemblies are platform-specific introduces the problem when a developer needs to deploy custom native assemblies along with "Any CPU" managed assemblies.

Microsoft™ supplies a mechanism, DllImport™, that performs binding to native assemblies. Binding is the process of attaching an application program interface point from one assembly to another, allowing use of the bound assembly. DllImport™ is limited because it does not support run-time binding to various assemblies based on platform type. Further, to use DllImport™, developers must know the exact location of the native assembly when the managed assembly is written, and either add the location to the system path or utilize specific code that identifies the location.

Prior solutions require complex, hard-to-debug code. Also, prior solutions encourage code duplication, which presents further issues in extra cost and defect risk in maintaining multiple copies of each platform interface.

The prior art may employ one or more of the following methods to dynamically bind to native assemblies from managed assemblies:

(1) DllImport (also known as System.Runtime.InteropServices.DllImport) (described above and more fully described in msdn.microsoft.com/en-us/library/system.runtime.interopservices.dllimportattribute.aspx which is incorporated by reference herein). However, as described above, such a solution does not support run-time binding to various assemblies based on platform type;

(2) Avoid runtime dynamic binding by building distinct platform specific managed assemblies. This requires non-orthogonal deployment by platform type. In other words, separate source code is created for every platform;

(3) Duplicating the API (application programming interface) interface declarations in the managed code, once for each supported platform. An exemplary use of API duplication is set forth in stackoverflow.com/questions/1319849/setting-dllimport-programatically-in-c which is fully incorporated by reference herein;

(4) Writing only two copies of each API interface, regardless of how many platforms are supported, but have the program write new executable code (known as emitting) and execute that emitted assembly. An exemplary use of such a solution is described in www.codeproject.com/KB/dotnet/DynamicDllImport.aspx which is incorporated by reference herein. In other words, code is emitted/written at run time which determines which assembly to bind to. Such emitted code inspects the platform the code is executed on, the processor type, etc. and a just-in-time complier complies and writes out an intermediate language to bind to the native assembly. One of the problems with such a solution is security; and (5) Manually writing code that loads the native assembly and binds to the entry point. An exemplary use of such manual code writing is set forth at www.codeproject.com/KB/cs/DynamicInvokeCSharp.aspx which is incorporated by reference herein.

Accordingly, a common practice is to utilize many distinct varieties of deployment platforms and further utilizing development platforms that may be different than deployed systems. Accordingly, there are many different code bases, one for every different platform. Prior art techniques require different deployments for the different platforms. What is needed is a method for utilizing both managed and native assemblies using a single deployment and single code base while supporting run-time binding to various assemblies based on platform type.

SUMMARY OF THE INVENTION

One or more embodiments of the invention provide the dynamic binding of native assemblies from platform agnostic managed assemblies. The concept of Microsoft's™ System.Runtime.InteropServices.DllImportAttribute class is extended by replacing it with an attribute class, DynamicDllImportAttribute, that can describe native application program interface entry points and associate their containing native assemblies by platform.

During program execution a second class, DynamicDllImportBinder, examines the managed interface, finds the DynamicDllImportAttribute interfaces, and makes the connection between the managed and native assemblies. This is the binding process.

Multiple DynamicDllImportAttribute instances can be applied to any given native entry point. Each instance represents the intended platform and the correct native assembly associated with that platform.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Overview

One or more embodiments of the invention provide a DynamicDllImport class that is implemented by applying an instance of it, as an attribute, to member properties of static managed classes. DynamicDllImportBinder, a companion class to DynamicDllImportAttribute is used during the static construction of the Managed class to execute the binding decisions and connect the appropriate exposed native assembly entry points to the Managed class.

Once the invention's code is referenced in a project, the developer only declares the following to achieve dynamic native assembly bindings: a prototype, assembly names, and a property. For example:

```
// Bind to entry point named "SomeAPIFunction1" in "Example.*.dll":
public delegate IntPtr SomeAPIFunction1Prototype( );
[DynamicDllImport(Platform.Win32, "Example.Win32.dll")]
[DynamicDllImport(Platform.X64, "Example.x64.dll")]
static public SomeAPIFunction1Prototype SomeAPIFunction1
{
  get;
  private set;
}
```

Deployment of an application that uses DynamicDllImport is simplified as the exact same set of files can be copied to any target computer, regardless of platform. The files that are not used by a specific platform are ignored at runtime by DynamicDllImport.

In addition, DynamicDllImport may be expanded to include other factors than simply the runtime platform to determine which native assembly to bind to.

Hardware Environment

Figure 1:
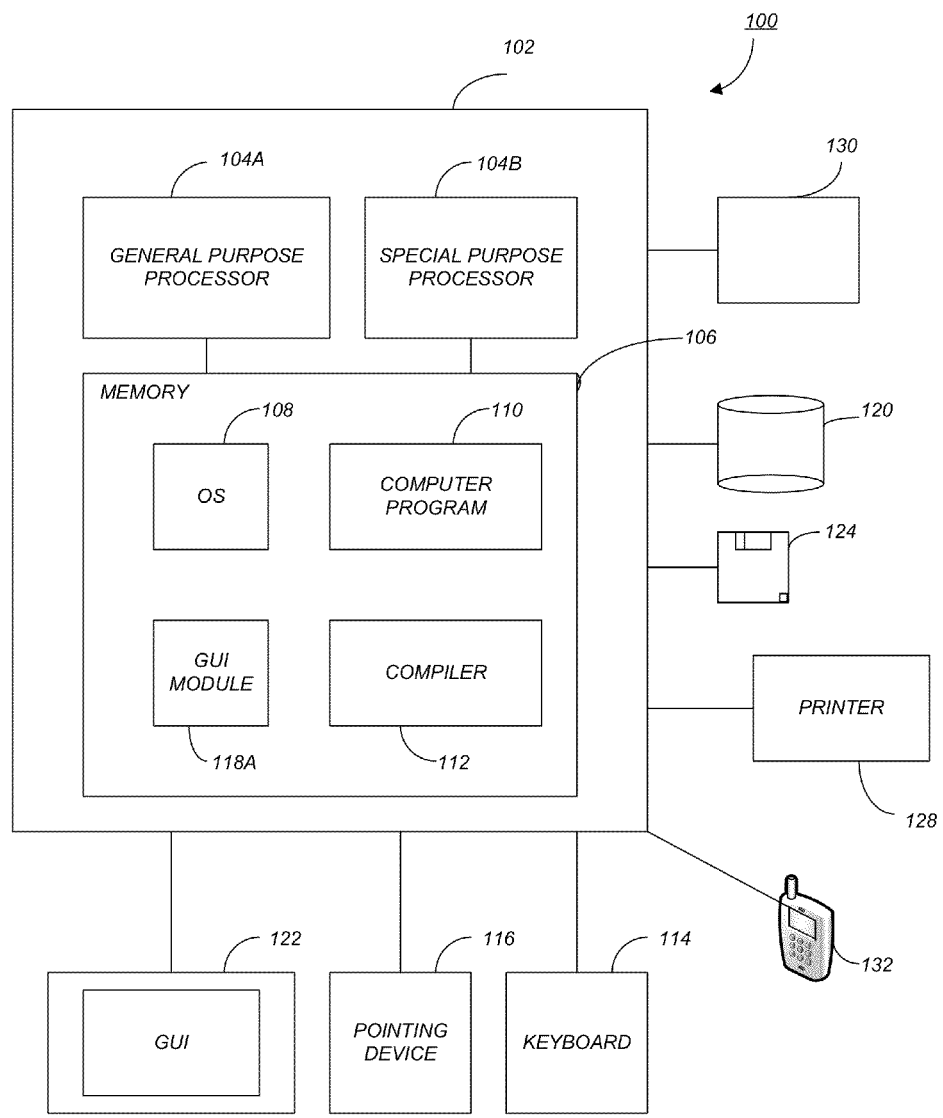
FIG. 1 is an exemplary hardware and software environment 100 used to implement one or more embodiments of the invention.

FIG. 1 is an exemplary hardware and software environment 100 used to implement one or more embodiments of the invention. The hardware and software environment includes a computer 102 and may include peripherals. Computer 102 may be a user/client computer, server computer, or may be a database computer. The computer 102 comprises a general purpose hardware processor 104A and/or a special purpose hardware processor 104B (hereinafter alternatively collectively referred to as processor 104) and a memory 106, such as random access memory (RAM). The computer 102 may be coupled to other devices, including input/output (I/O) devices such as a keyboard 114, a cursor control device 116 (e.g., a mouse, a pointing device, pen and tablet, etc.) and a printer 128. In one or more embodiments, computer 102 may be coupled to a portable/mobile device 132 (e.g., an MP3 player, iPod™, Nook™, portable digital video player, cellular device, personal digital assistant, etc.).

In one embodiment, the computer 102 operates by the general purpose processor 104A performing instructions defined by the computer program 110 under control of an operating system 108. The computer program 110 and/or the operating system 108 may be stored in the memory 106 and may interface with the user and/or other devices to accept input and commands and, based on such input and commands and the instructions defined by the computer program 110 and operating system 108 to provide output and results.

Output/results may be presented on the display 122 or provided to another device for presentation or further processing or action. In one embodiment, the display 122 comprises a liquid crystal display (LCD) having a plurality of separately addressable liquid crystals. Each liquid crystal of the display 122 changes to an opaque or translucent state to form a part of the image on the display in response to the data or information generated by the processor 104 from the application of the instructions of the computer program 110 and/or operating system 108 to the input and commands. The image may be provided through a graphical user interface (GUI) module 118A. Although the GUI module 118A is depicted as a separate module, the instructions performing the GUI functions can be resident or distributed in the operating system 108, the computer program 110, or implemented with special purpose memory and processors.

Some or all of the operations performed by the computer 102 according to the computer program 110 instructions may be implemented in a special purpose processor 104B. In this embodiment, the some or all of the computer program 110 instructions may be implemented via firmware instructions stored in a read only memory (ROM), a programmable read only memory (PROM) or flash memory within the special purpose processor 104B or in memory 106. The special purpose processor 104B may also be hardwired through circuit design to perform some or all of the operations to implement the present invention. Further, the special purpose processor 104B may be a hybrid processor, which includes dedicated circuitry for performing a subset of functions, and other circuits for performing more general functions such as responding to computer program instructions. In one embodiment, the special purpose processor is an application specific integrated circuit (ASIC).

As used herein, the computer 102 may be utilized within a .NET™ framework available from Microsoft™. The .NET framework is a software framework (e.g., computer program 110) that can be installed on computers 102 running Microsoft™ Windows™ operating systems 108. It includes a large library of coded solutions to common programming problems and a virtual machine that manages the execution of programs 110 written specifically for the framework. The .NET framework can support multiple programming languages in a manner that allows language interoperability.

The computer 102 may also implement a compiler 112 which allows an application program 110 written in a programming language such as COBOL, Pascal, C++, FORTRAN, or other language to be translated into processor 104 readable code. After completion, the application or computer program 110 accesses and manipulates data accepted from I/O devices and stored in the memory 106 of the computer 102 using the relationships and logic that was generated using the compiler 112.

The computer 102 also optionally comprises an external communication device such as a modem, satellite link, Ethernet card, or other device for accepting input from and providing output to other computers 102.

In one embodiment, instructions implementing the operating system 108, the computer program 110, and the compiler 112 are tangibly embodied in a computer-readable medium, e.g., data storage device 120, which could include one or more fixed or removable data storage devices, such as a zip drive, floppy disc drive 124, hard drive, CD-ROM drive, tape drive, etc. Further, the operating system 108 and the computer program 110 are comprised of computer program instructions which, when accessed, read and executed by the computer 102, causes the computer 102 to perform the steps necessary to implement and/or use the present invention or to load the program of instructions into a memory, thus creating a special purpose data structure causing the computer to operate as a specially programmed computer executing the method steps described herein. Computer program 110 and/or operating instructions may also be tangibly embodied in memory 106 and/or data communications devices 130, thereby making a computer program product or article of manufacture according to the invention. As such, the terms "article of manufacture," "program storage device" and "computer program product" as used herein are intended to encompass a computer program accessible from any computer readable device or media.

Of course, those skilled in the art will recognize that any combination of the above components, or any number of different components, peripherals, and other devices, may be used with the computer 102.

Although the term "user computer" or "client computer" is referred to herein, it is understood that a user computer 102 may include portable devices such as cell phones, notebook computers, pocket computers, or any other device with suitable processing, communication, and input/output capability.

Figure 2:
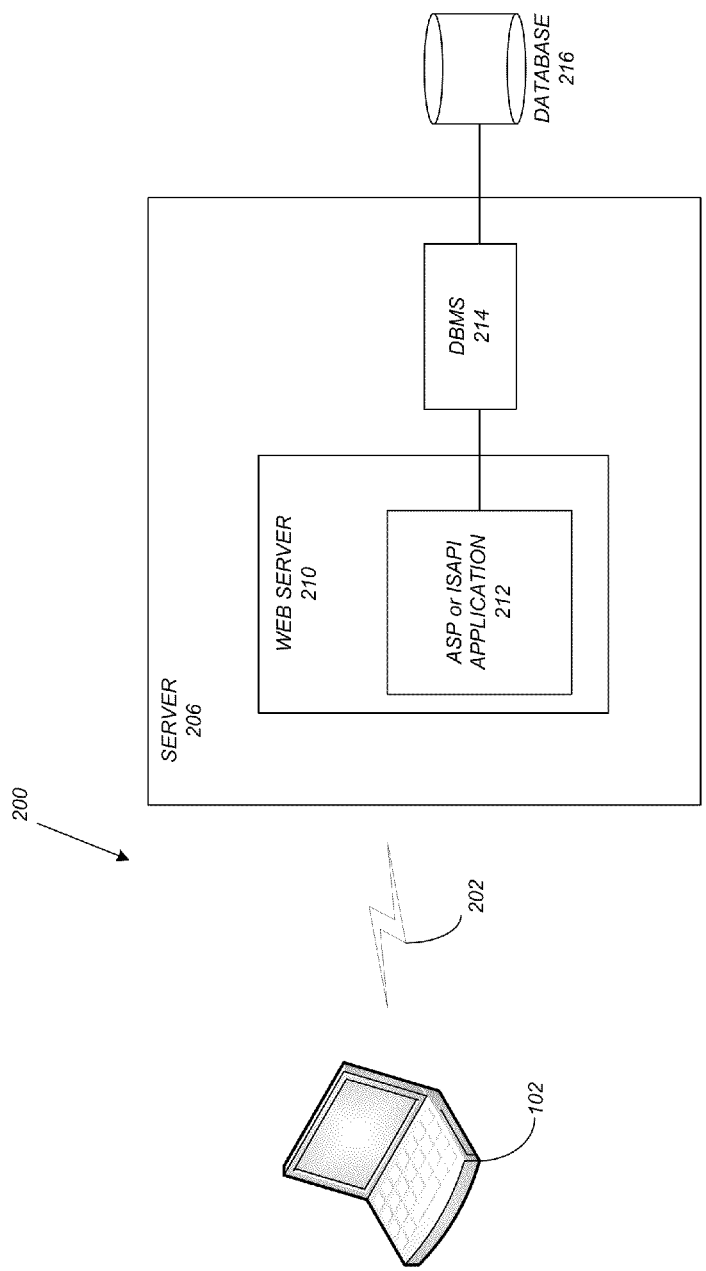
FIG. 2 schematically illustrates a typical distributed computer system using a network to connect client computers to server computers in accordance with one or more embodiments of the invention.

FIG. 2 schematically illustrates a typical distributed computer system 200 using a network 202 to connect client computers 102 to server computers 206. A typical combination of resources may include a network 202 comprising the Internet, LANs (local area networks), WANs (wide area networks), SNA (systems network architecture) networks, or the like, clients 102 that are personal computers or workstations, and servers 206 that are personal computers, workstations, minicomputers, or mainframes (as set forth in FIG. 1).

A network 202 such as the Internet connects clients 102 to server computers 206. Network 202 may utilize ethernet, coaxial cable, wireless communications, radio frequency (RF), etc. to connect and provide the communication between clients 102 and servers 206. Clients 102 may execute a client application or web browser and communicate with server computers 206 executing web servers 210. Such a web browser is typically a program such as MICROSOFT INTERNET EXPLORER™, MOZILLA FIREFOX™, OPERA™, APPLE SAFARI™, etc. Further, the software executing on clients 102 may be downloaded from server computer 206 to client computers 102 and installed as a plug in or ACTIVEX™ control of a web browser. Accordingly, clients 102 may utilize ACTIVEX™ components/component object model (COM) or distributed COM (DCOM) components to provide a user interface on a display of client 102. The web server 210 is typically a program such as MICROSOFT'S INTERNET INFORMATION SERVER™.

Web server 210 may host an Active Server Page (ASP) or Internet Server Application Programming Interface (ISAPI) application 212, which may be executing scripts. The scripts invoke objects that execute business logic (referred to as business objects). The business objects then manipulate data in database 216 through a database management system (DBMS) 214. Alternatively, database 216 may be part of or connected directly to client 102 instead of communicating/obtaining the information from database 216 across network 202. When a developer encapsulates the business functionality into objects, the system may be referred to as a component object model (COM) system. Accordingly, the scripts executing on web server 210 (and/or application 212) invoke COM objects that implement the business logic. Further, server 206 may utilize MICROSOFT'S™ Transaction Server (MTS) to access required data stored in database 216 via an interface such as ADO (Active Data Objects), OLE DB (Object Linking and Embedding DataBase), or ODBC (Open DataBase Connectivity).

Generally, these components 208-218 all comprise logic and/or data that is embodied in/or retrievable from device, medium, signal, or carrier, e.g., a data storage device, a data communications device, a remote computer or device coupled to the computer via a network or via another data communications device, etc. Moreover, this logic and/or data, when read, executed, and/or interpreted, results in the steps necessary to implement and/or use the present invention being performed.

Although the term "user computer", "client computer", and/or "server computer" is referred to herein, it is understood that such computers 102 and 206 may include portable devices such as cell phones, notebook computers, pocket computers, or any other device with suitable processing, communication, and input/output capability.

Of course, those skilled in the art will recognize that any combination of the above components, or any number of different components, peripherals, and other devices, may be used with computers 102 and 206.

Software Embodiments

Embodiments of the invention are implemented as a software application 110 on a client 102 or server computer 206 and may be referred to herein as "DynamicDLL Import." DynamicDLL Import works similar to the DLLImportAttribute™ class offered by Microsoft™ except that the DynamicDLL Import adds the ability to decide which specific native assembly to bind to at run time. Primarily, DynamicDLL Import is used to ease deployment of "Any CPU" managed assemblies that rely on platform-specific native assemblies.

Figure 3:
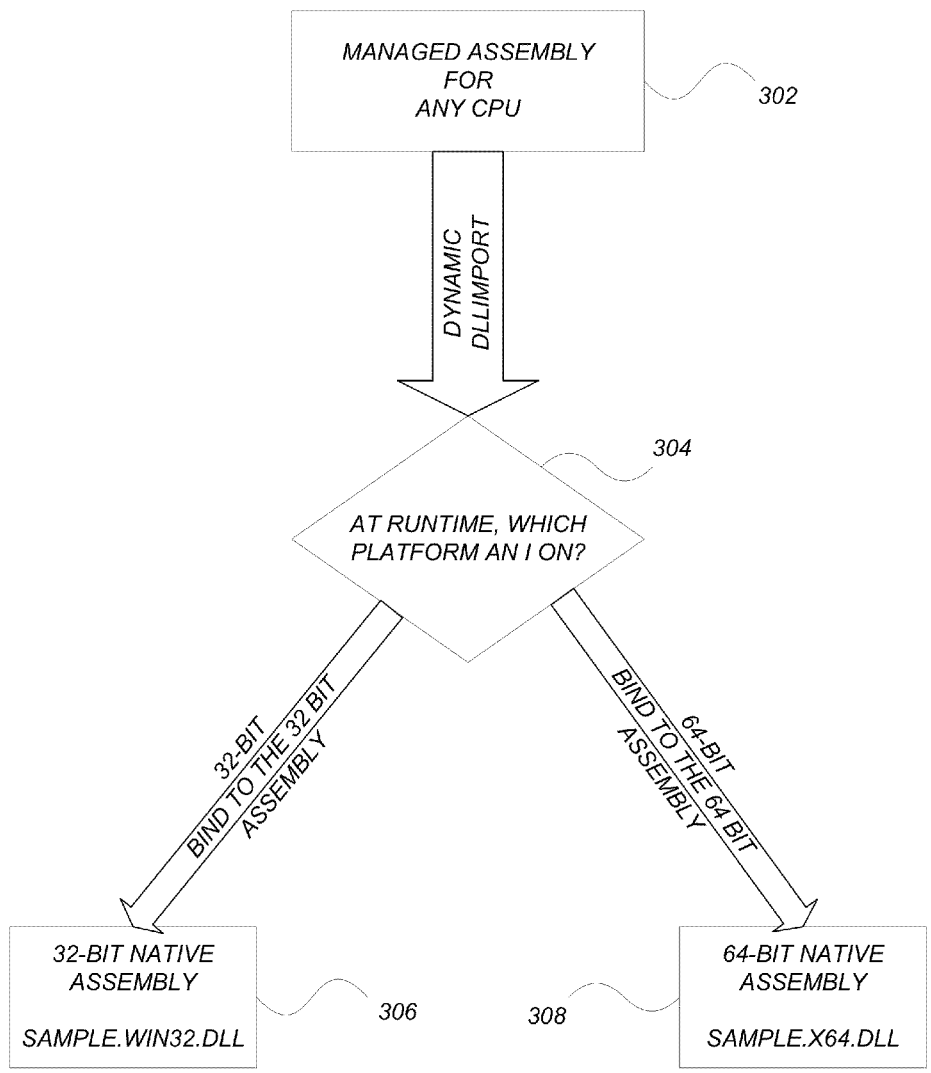
FIG. 3 illustrates an architectural overview of the flow for dynamically binding native assemblies in accordance with one or more embodiments of the invention.

FIG. 3 illustrates an architectural overview of the flow for dynamically binding native assemblies in accordance with one or more embodiments of the invention. As illustrated, a managed assembly 302 is created for "Any CPU". The managed assembly 302 utilizes/makes a call to the DynamicDLL Import function. During run time, the DynamicDLL Import function determines which platform the application is executing on at 304.

FIG. 3 illustrates two different potential native assemblies/platforms. However, the invention is not limited to such native platforms/assemblies and may include other, different, additional, and/or alternative options to those illustrated. The two different native assemblies of FIG. 3 are that of 32-bit native assembly 306 and 64-bit native assembly 308. At decision 304, a determination is made regarding which platform the application is executed on and the DynamicDLL Import function then binds to the appropriate native assembly (e.g., sample.win32.DLL or samle.x64.DLL).

Figure 4:
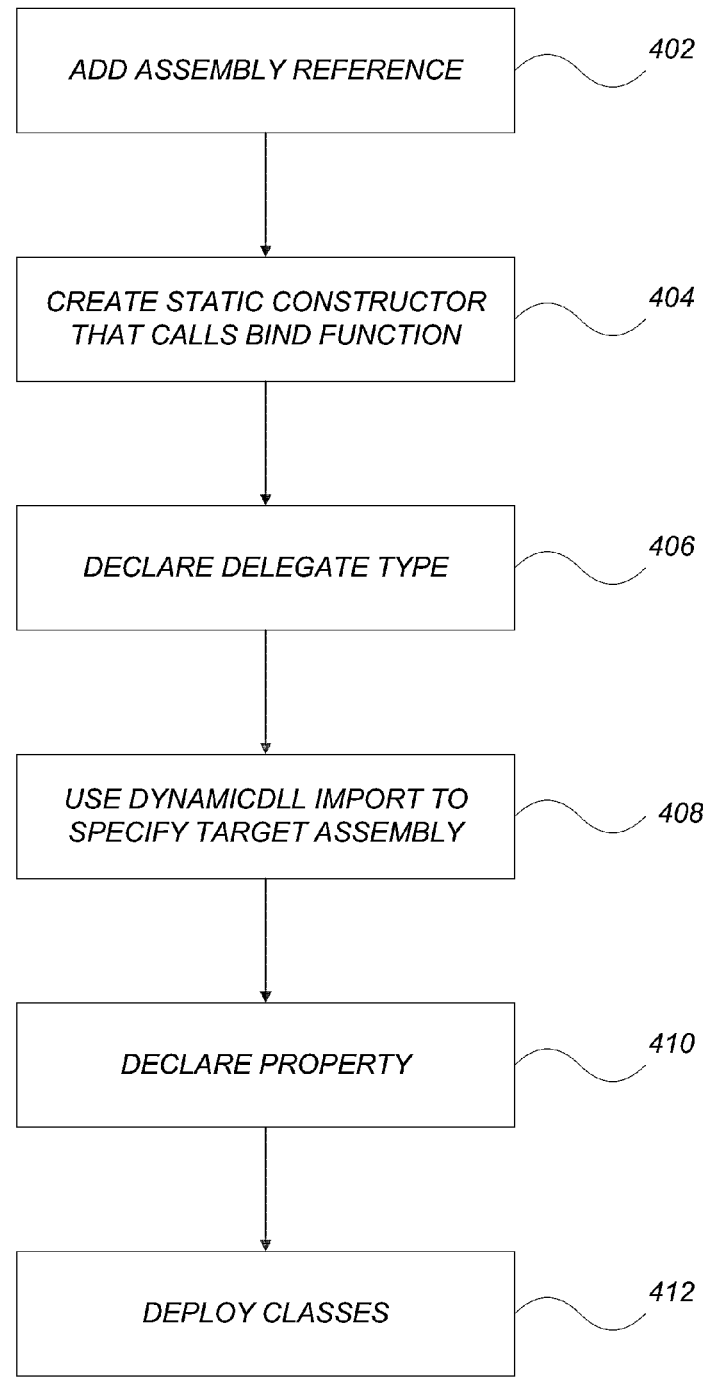
FIG. 4 is a flowchart illustrating the logical flow for using the DynamicDLL Import function in accordance with one or more embodiments of the invention.

FIG. 4 is a flowchart illustrating the logical flow for using the DynamicDLL Import function in accordance with one or more embodiments of the invention. The Table below illustrates the example code in accordance with the flowchart of FIG. 4.

```
using System;
using MySpace.Common.Runtime.InteropServices;
public static class ExampleNativeAPI
{
  public static ExampleNativeApi( )
  {
    DynamicDLLImportBinder.Bind(typeof(ExampleNativeApi));
  }
  // Bind to entry point named "SomeAPIFunction1" in "Example.*.dll";
  public delegate IntPtr SomeAPIFunction1Prototype( );
  [DynamicDllImport(Platform.Win32, "Example.Win32.dll")]
  [DynamicDllImport(Platform.X64, "Example.X64.dll")]
  Static public SomeAPIFunction1Prototype SomeAPIFunction1 {get;
private set;}
  // Bind to entry point named "DeleteItem" in "Example.*.dll", and
declare marshalling;
  public delegate void DeleteItemPrototype (
     IntPtr xdb,
     [MarshalAs(UnmanagedType.LPArray)]
     byte[ ]keyValue,
     byte keyLength);
  [DynamicDllImport(Platform.Win32, "Example.Win32.dll")]
  [DynamicDllImport(Platform.X64, "Example.X64.dll")]
  Static public DeleteItemPrototype DeleteItem (get; private set;)
}
```

At step 402, an assembly reference is added to a managed assembly (e.g., myspace.common.dll). Such a DLL may be located in a particular folder/location (e.g., a drop folder).

At step 404, a static constructor is created (e.g., for the ExampleNativeAPI class). The static constructor executes the binding decisions and connects the appropriate exposed native assembly entry points to the managed class (i.e., at run-time). In the example code above, the static constructor calls "DynamicDllImportBinder.Bind( )" with the type of the enclosing class as its parameter (i.e., the type of class of the ExampleNativeAPI).

At step 406, a delegate type is declared that defines the prototype of the static native assembly entry points. Entry points identify the locations of a function within a DLL. Marshalling attributes (i.e., moving data outside of the domain/assembly the application is executed in to a different domain/assembly) may be used in the declaration. As used herein, a delegate is a form of type-safe function pointer used by the .NET framework. Delegates specify a method to call and optionally, an object to call the method on. Often, delegates are used to implement callbacks.

In the exemplary code, there are two entry points (i.e., for the native assemblies): SomeAPIFunction1 and DeleteItem (which includes marshalling). The prototype method "SomeAPIFuntion1Prototype( )" is declared as type IntPtr (i.e., a platform-specific integer type that is used to represent a pointer or a handle). For example, the IntPtr type can be an integer whose size is platform-specific as 32-bits on 32-bit hardware/operating systems or 64-bits on 64-bit hardware/operating systems. Thus, in the exemplary code, the prototype function is a delegate of type IntPtr. Similarly, the DeleteItem prototype is declared as type void.

At step 408, one or more [DynamicDllImport] attribute declarations may be used to specify the target assembly and the corresponding assembly name. In the exemplary code, the following code is used to specify the target assemblies for Win32 and X64:

```
[DynamicDllImport(Platform.Win32, "Example.X64.dll")]
[DynamicDllImport(Platform.X64, "Example.X64.dll")]
```

At step 410, a property is declared as a type of the prototype delegate with a getter and a setter. In the above example, for each prototype delegate (i.e., SomeAPIFunction1 and DeleteItemPrototype), get and set parameters are used to declare the type of delegate.

At step 412, the classes using the DynamicDLL Import are deployed. When deploying such classes, care should be taken to include the native assemblies, if they are not already installed on the target computers. For example, the MSBuild™ build platform generally does not automatically deploy dependent native assemblies with managed assemblies.

The following code illustrates an exemplary implementation of the DynamicDLLImportAttribute class that can be applied to member properties of static managed classes to implement one or more embodiments of the invention.

```
namespace MySpace.Common.Runtime.Interop Services
{
  /// <summary>
  /// DynamicDllImportAttribute allows runtime binding to native
assemblies based on platform type.
  /// </summary>
  [AttributeUsage(AttributeTargets.Property, AllowMultiple = true)]
  public class DynamicDllImportAttribute : Attribute
  {
    /// <summary>
    /// TargetPlatform is used by DynamicDllImportBinder to
determine the platform the element embued with this
attribute is relevant for.
    /// </summary>
    public Platform TargetPlatform {get; private set; }
    /// <summary>
    /// AssemblyName identifies the path to the native assembly that
represents to platform-specific native assembly. The full path isn't required
as DynamicDllImport Binder will search various well-known locations to
find the assembly. (Deployment directory and environment path).
    /// </summary>
    public String AssemblyName {get; private set; }
    /// <summary>
    /// EntryPoint is optional. If unspecified, the EntryPoint is
determined by the reflected name of the element that binds to the native
assembly. Specify an EntryPoint if the actual entrypoint is not sytactically
possible to write. For example, native assemblies may specify entry points
such as "_MyEntryPoint@16", which cannot be a valid symbol name in c#.
    /// </summary>
    public String EntryPoint {get; set;}
    /// <summary>
    /// Initializes a new instance of the <see
cref="DynamicDllIMportAttribute"/>class.
    /// </summary>
    /// <param name="targetPlatform">The target platform.</param>
    /// <param name="assemblyName">Name of the native assembly
for the specified platform.</param>
    public DynamicDllImportAttribute(Platform targetPlatform, string
assemblyName)
    {
       AssemblyName = assemblyName;
       TargetPlatform = targetPlatform;
    }
  }
}
namespace MySpace.Common.Runtime.Interop Services
{
  /// <summary>
  /// DynamicDllImportBinder uses reflection to bind a native assembly
to managed delegated. <see cref="DyanmicDllImportAttribute"/>
depends on
  the binder for the attribute to function
  /// </summary>
  public static class DynamicDllImportBinder
```

-continued

```
{
    private static readonly Dictionary<string, IntPtr> Libraries = new
Dictionary <string, IntPtr>( );
    private static readonly Platform EffectivePlatform = IntPtr.Size == 4 ?
Platform.Win3s : Platform.X64;
    /// <summary>
    /// Binds the delegate properties of the type to native assemblies.
Properties bound are marked with <see
cref="DynamicDllImportAttribute"/>.l Classes would normally call
DynamicDllImportbinder.Bind( ) in a static constructor.
    /// </summary>
    /// <param name="type">The type that contains delegates that
have the DynamicDllImport attribute applied to them. </param>
    public static void Bind(Type type)
    {
        /// reflect over the type class find all properties that have
        the DynamicDllImportAttribute, and bind them to the assembly
        referenced.
        var properties = type.GetProperties(BindingFlags.Static |
BindingFlags.NonPublic | BindingFlags.Public);
        foreach (var property in properties)
        {
            var attributes = property.GetCustomAttributes(typeof
(DynamicDllIMportAttribute), falst);
            if (attributes.Length > 0)
            {
                foreach (DynamicDllImportAttribute attribute in
                attributes)
                {
                    if (attribute.TargetPlatform ==
                    EffectivePlatform)
                    {
                        property.SetValue(null,
GetUnmanagedDelegate(attribute.AseemblyName, attribute.Entrypoint ??
property.Name, Property.PropertyType), null);
                    }
                }
            }
        }
    }
    private static Delegate GetUnmanagedDelegate(string
unmanagedAssembly, string entryPoint, Type DelegateType)
    {
        IntPtr hModule;
        if (Libraries.ContainsKey(unmanagedAssembly))
        {
            hModule = Libraries[unmanagedAssembly];
        }
        else
        {
            hModule =
AttemptLoadLibrary(unmanagedAssembly);
            if (hModule == IntPtr.Zero)
            {
                throw new ApplicationException(String.Format(
                "Cannot load assembly {0}with error code 0x {1.x}. Deploy
                this native assembly with the managed assemblies (the .NET
                framework may not automatically copy it for you), or that it is
                in the environment Path of the process.", unamangedAssembly,
                Marshal.GetLastWin32Error( )));
            }
            Libraries[unmanagedAssembly] = hModule;
        }
        IntPtr procAddr = GetProcAddress(hModule, entryPoint);
        if (procAddr == IntPtr.Zero)
        {
            throw new ApplicationException(String.Format(
            "Could not bind to entry point {0}in assembly {1}. The
            assembly was found, but binding to the entry point failed with
            code 0x {2:x}.", entryPoint, unamangedAssembly,
            Marshal.GetLastWin32Error( )));
        }
        return Marshal.GetDelegateForFurnctionPointer(procAddr,
delegateType);
    }
    [DllImport("kernel32.dll", SetLastError = true)]
    private static extern IntPtr LoadLibrary(String dllName);
    [DllImport("kernel32.dll", SetLastError = true)]
    private static extern IntPtr GetProcAddress(IntPtr hModule, String
procName);
    private static IntPtr AttemptLoadLibrary(string unmanagedAssembly)
    {
        // try to load it in the current environment PATH (normal
        for location native assemblies).
        var hModule = LoadLibrary(unmanagedAssembly);
        if (hModule == IntPtr.Zero)
        {
            ShadowCopier.CopyAssemblyFile(unamagnedAssembly);
            hModule = LoadLibrary(Path.Combine
            (AppDomain.CurrentDomain.BaseDirectory,
            unamangedAssembly));
        }
        return hModule;
    }
}
```

Logical Flow

Figure 5:
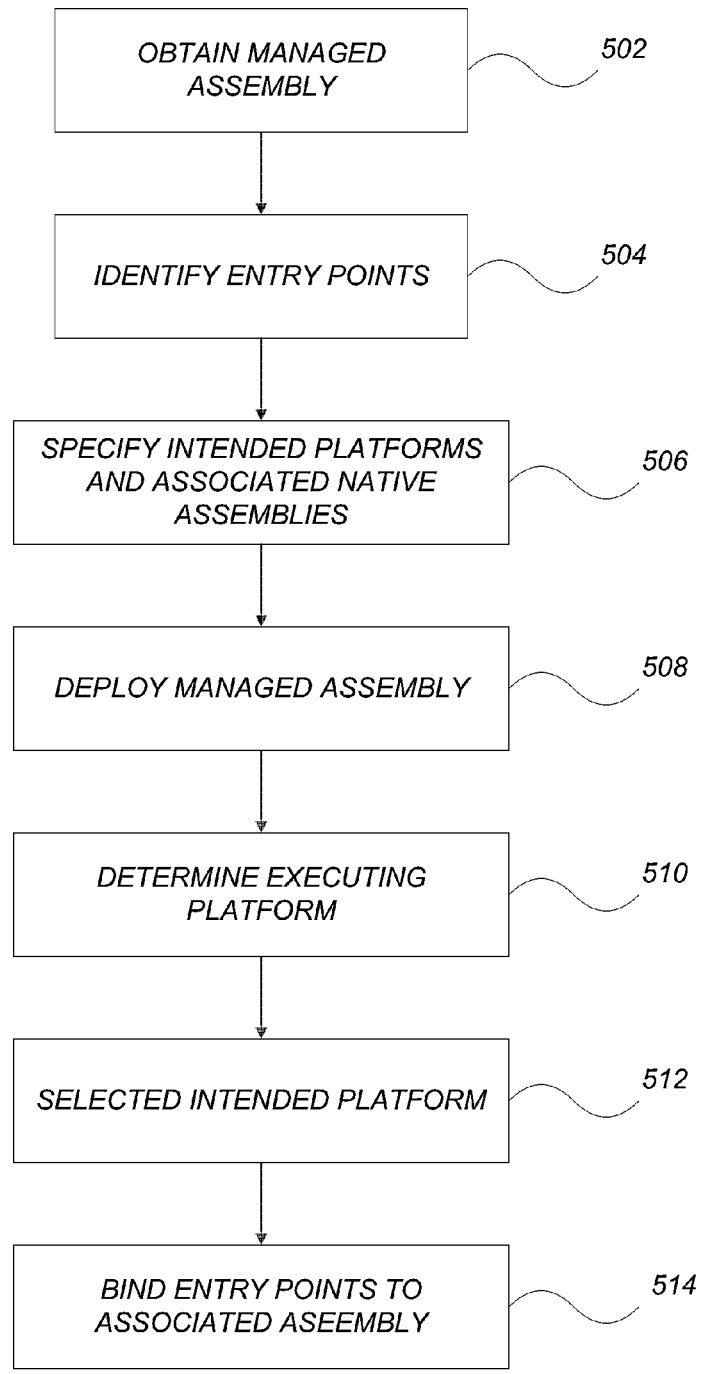
FIG. 5 is a flowchart illustrating the logical flow for dynamically binding a native assembly from a managed assembly in accordance with one or more embodiments of the invention.

FIG. 5 is a flowchart illustrating the logical flow for dynamically binding a native assembly from a managed assembly in accordance with one or more embodiments of the invention. At step 502, a managed assembly is obtained. Such a managed assembly is a dynamic linked library (DLL).

At step 504, one or more native application program interface entry points are identified in the managed assembly.

At step 506, for each of the one or more entry points, one or more intended platforms are specified in the managed assembly. In addition, for each of the one or more intended platforms, an associated correct native assembly is also specified in the managed assembly. To specify the intended platforms and associated native assemblies, an instance of a class may be applied as an attribute to each of the entry points. Intended platforms may include a 32-bit native assembly, a 64-bit native assembly, or any other type of platform.

At step 508, the managed assembly is deployed onto a first computer.

Steps 510-514 are all performed during runtime execution. Further, a binding class may be used during a static construction of the managed assembly during runtime execution to perform steps 510-514.

At step 510, the executing platform of the application (i.e., on the first computer) is determined.

At step 512, one of the one or more intended platforms is selected based on the executing platform.

At step 514, each of the entry points from the managed assembly is bound to the associated correct native assembly based on the selected intended platform.

CONCLUSION

This concludes the description of the preferred embodiment of the invention. The following describes some alternative embodiments for accomplishing the present invention. For example, any type of computer, such as a mainframe, minicomputer, or personal computer, or computer configuration, such as a timesharing mainframe, local area network, or standalone personal computer, could be used with the present invention.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A computer implemented method for dynamically binding a native assembly from a managed assembly, comprising:
obtaining a managed assembly comprising a dynamic linked library (DLL);
identifying, in the managed assembly, one or more native application program interface entry points;
for each of the one or more native application program interface entry points, specifying, in the managed assembly:
one or more intended platforms; and
for each of the one or more intended platforms, an associated correct native assembly;
deploying the managed assembly onto a first computer; and
during runtime execution:
determining an executing platform of an application;
selecting one of the one or more intended platforms based on the executing platform; and
binding each of the one or more native application program interface entry points from the managed assembly to the associated correct native assembly based on the selected intended platform.

2. The computer-implemented method of claim 1, wherein an instance of a class is applied, as an attribute to each of the one or more native application program interface entry points, to specify the one or more intended platforms and the associated correct native assembly.

3. The computer-implemented method of claim 1, wherein a binding class is used during a static construction of the managed assembly during the runtime execution to perform the determining, selecting, and binding steps.

4. The computer-implemented method of claim 1, wherein the one of the one or more intended platforms comprises a 32-bit native assembly.

5. The computer-implemented method of claim 1, wherein the one of the one or more intended platforms comprises a 64-bit native assembly.

6. A system for dynamically binding a native assembly from a managed assembly in a computer system comprising:
a computer having a processor;
an application executing on the computer, wherein the application is configured to:
obtain the managed assembly comprising a dynamic linked library (DLL);
identify, in the managed assembly, one or more native application program interface entry points;
for each of the one or more native application program interface entry points, specify, in the managed assembly:
one or more intended platforms; and
for each of the one or more intended platforms, an associated correct native assembly;
deploy the managed assembly onto the computer; and
during runtime execution of the application:
determine an executing platform of the application;
select one of the one or more intended platforms based on the executing platform; and
bind each of the one or more native application program interface entry points from the managed assembly to the associated correct native assembly based on the selected intended platform.

7. The system of claim 6, wherein an instance of a class is applied, as an attribute to each of the one or more native application program interface entry points, to specify the one or more intended platforms and the associated correct native assembly.

8. The system of claim 6, wherein a binding class is used during a static construction of the managed assembly during the runtime execution to perform the determining, selecting, and binding steps.

9. The system of claim 6, wherein the one of the one or more intended platforms comprises a 32-bit native assembly.

10. The system of claim 6, wherein the one of the one or more intended platforms comprises a 64-bit native assembly.

11. A non-transitory computer readable storage medium encoded with computer program instructions which when accessed by a computer cause the computer to load the computer program instructions to a memory therein creating a special purpose data structure causing the computer to operate as a specially programmed computer, executing a method of dynamically binding a native assembly from a managed assembly, comprising:
obtaining, in the specially programmed computer, the managed assembly comprising a dynamic linked library (DLL);
identifying, in the managed assembly in the specially programmed computer, one or more native application program interface entry points;
for each of the one or more native application program interface entry points, specifying, in the managed assembly in the specially programmed computer:
one or more intended platforms; and
for each of the one or more intended platforms, an associated correct native assembly;
deploying the managed assembly onto the specially programmed computer; and
during runtime execution:
determining, in the specially programmed computer, an executing platform of an application;
selecting, in the specially programmed computer, one of the one or more intended platforms based on the executing platform; and
binding, in the specially programmed computer, each of the one or more native application program interface entry points from the managed assembly to the associated correct native assembly based on the selected intended platform.

12. The non-transitory computer readable storage medium of claim 11, wherein an instance of a class is applied, as an attribute to each of the one or more native application program interface entry points, to specify the one or more intended platforms and the associated correct native assembly.

13. The non-transitory computer readable storage medium of claim 11, wherein a binding class is used during a static construction of the managed assembly during the runtime execution to perform the determining, selecting, and binding steps.

14. The non-transitory computer readable storage medium of claim 11, wherein the one of the one or more intended platforms comprises a 32-bit native assembly.

15. The non-transitory computer readable storage medium of claim 11, wherein the one of the one or more intended platforms comprises a 64-bit native assembly.

* * * * *